(12) United States Patent
Lagerweij (10) Patent No.: US 6,637,712 B1
(45) Date of Patent: Oct. 28, 2003

(54) AUTOMOTIVE SEAT TRACK LOCK MECHANISM WITH POSITIVE ENGAGEMENT

(75) Inventor: Richard Allen Lagerweij, Thornton (CA)

(73) Assignee: Dura Global Technologies, Inc., Rochester Hill, MI (US)

( * ) Notice: Subject to any disclaimer, the term of this patent is extended or adjusted under 35 U.S.C. 154(b) by 0 days.

(21) Appl. No.: 10/153,492

(22) Filed: May 17, 2002

(51) Int. Cl.[7] .............................................. F16M 13/00
(52) U.S. Cl. ......................................... 248/429; 296/64
(58) Field of Search .................................. 248/429, 423, 248/424; 296/64, 65.1, 68.1; 297/344.1, 463.1

(56) References Cited

U.S. PATENT DOCUMENTS

| | | | | |
|---|---|---|---|---|
| 5,192,045 A | * | 3/1993 | Yamada et al. | 248/430 |
| 5,918,846 A | * | 7/1999 | Garrido | 248/429 |
| 6,036,267 A | * | 3/2000 | Downey et al. | 297/341 |
| 6,098,946 A | * | 8/2000 | Sechet et al. | 248/424 |
| 6,113,051 A | * | 9/2000 | Moradell et al. | 248/430 |
| 6,322,036 B1 | * | 11/2001 | Tame et al. | 248/429 |
| 6,354,553 B1 | * | 3/2002 | Lagerweij et al. | 248/430 |
| 2003/0006355 A1 | * | 1/2003 | Horsfield et al. | 248/429 |

* cited by examiner

*Primary Examiner*—Leslie A. Braun
*Assistant Examiner*—Kofi Schulterbrandt
(74) *Attorney, Agent, or Firm*—Richard Mescher; Casimir R. Kiczek (57) ABSTRACT

A seat track assembly includes a lock having a lock pin movable between locking and unlocking positions. A guide forms a cylinder supporting movement of the lock pin and first and second shear plates are located on opposite sides of the guide. A spring member resiliently biases the lock pin toward the locking position. The lock pin extends through openings in the first and second shear plates. The lock pin, the guide, and the spring member are located entirely within an interior space of a movable track. A release assembly includes a bracket secured to the movable track, a pivotable fork, and a handle pivotally attached to the bracket and operably engaging the fork so that pivotable movement of the handle pivots the fork to move the lock pin. A secondary spring member biases the release assembly toward the locking position.

28 Claims, 9 Drawing Sheets

Fig. 12

AUTOMOTIVE SEAT TRACK LOCK MECHANISM WITH POSITIVE ENGAGEMENT

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

FIELD OF THE INVENTION

The present invention generally relates to seat track assemblies allowing for adjustment of a seat with respect to a fixed member such as a motor vehicle and, more particularly, to lock mechanisms of the seat track assemblies.

BACKGROUND OF THE INVENTION

Seat track assemblies are used to move a seat, typically in at least forward and rearward directions, in a motor vehicle. Such seat track assemblies typically have a first track assembly including a pair of parallel, laterally spaced-apart first slides or tracks and a second track assembly including a pair of parallel, laterally spaced-apart second slides or tracks, with each second track supported by and movable relative to a corresponding one of the first tracks. The seat is mounted to the second tracks and is movable therewith relative to the first tracks. An adjuster lock or latch mechanism is provided to selectively secure the second tracks, and the seat, relative to the first tracks. Such latch mechanisms typically include, for example, a latch with openings or windows mounted on one of the tracks which engage teeth on the other one of the tracks, or a latch with teeth mounted on one of the tracks which engage openings or notches in the other one of the tracks. Typically, a handle or control bar, often referred to as a towel bar, is used to operate the latch between a latching or locking position and an unlatching or unlocking position. An occupant of the seat adjusts the position of the seat by actuating the handle to move the latch to the unlatching position, wherein the second tracks and seat are movable relative to the first tracks. The occupant moves the seat to a desired position and releases the handle so that the spring biased latch returns to the latched position, wherein the second tracks and seat are in a substantially fixed position relative to the first tracks.

German Patent Number 44 00 232, the disclosure of which is expressly incorporated herein in its entirety by reference, discloses one type of latch mechanism which includes a plurality of independently spring-biased lock pins or fingers. The lock pins are carried by the second track and are spring biased toward the locking position wherein they extend into openings in the first track. Typically, only two lock fingers are needed in the locking position, one to prevent sliding movement in the rearward direction and one to prevent sliding movement in the forward direction. These mechanisms, however, often have three, four, or more locking fingers wherein some of the locking fingers do not penetrate one of the openings in the first track in a typical locking position. While such latch mechanisms have many advantages over other latch mechanisms they typically result in an undesirably large height and typically use a large number of separate parts and or complex parts.

U.S. Pat. No. 6,231,022, the disclosure of which is expressly incorporated herein in its entirety by reference, discloses one attempt to solve this problem. While the latch mechanism has a reduced height, it still provides an undesirably large height and requires complex parts to obtain the minimal height reduction. Additionally, the numerous parts and/or complex parts are not conducive to low cost or rapid assembly of the seat track assemblies. Accordingly, there is a need in the art for an improved seat track assembly having a latch mechanism which further reduces the height, reduces the number of parts required, has a relatively low cost to produce, and/or can be rapidly assembled.

SUMMARY OF THE INVENTION

In accordance with one aspect of the present invention, a seat track comprises, in combination, a first track and a second track movable relative to the first track in a longitudinal direction. A lock mechanism carried by the second track and includes a lock pin axially movable between a locking position wherein the lock pin is in engagement with the first track so that the second track is secured against movement relative to the first track and an unlocking position wherein the lock pin is out of engagement with the first track so that the second track is movable relative to the first track. A guide forms a cylinder supporting axial movement of the lock pin and first and second shear plates are located on opposite sides of the guide. A spring member resiliently biases the lock pin toward the locking position. The lock pin extends through openings in the first and second shear plates and the first and second shear plates are secured to the second track.

In accordance with another aspect of the present invention, a seat track assembly comprises, in combination, a seat track assembly comprising, in combination a first track and a second track having an interior space and movable relative to the first track in a longitudinal direction. A lock mechanism carried by the second track includes a lock pin axially movable between a locking position wherein the lock pin is in engagement with the first track so that the second track is secured against movement relative to the first track and an unlocking position wherein the lock pin is out of engagement with the first track so that the second track is movable relative to the first track. A guide forms a cylinder supporting axial movement of the lock pin and a spring member resiliently biases the lock pin toward the locking position. The lock pin, the guide and the spring member are each located entirely within the interior space of the second track when the lock pin is in the unlocking position.

In accordance with yet another aspect of the present invention, a seat track assembly comprises, in combination, a first track and a second track movable relative to the first track in a longitudinal direction. A lock mechanism carried by the second track includes a lock pin axially movable between a locking position wherein the lock pin is in engagement with the first track so that the second track is secured against movement relative to the first track and an unlocking position wherein the lock pin is out of engagement with the first track so that the second track is movable relative to the first track. A guide forming a cylinder supports axial movement of the lock pin and a spring member resiliently biases the lock pin toward the locking position. A release assembly is provided for selectively moving the lock pin to the unlocking position. The release assembly includes a bracket secured to the second track, a fork pivotably attached to the bracket and operably engaging the lock pin so that pivotable movement of the fork moves the lock pin against the bias of the spring member, and a handle pivotally attached to the bracket and operably engaging the release fork so that pivotable movement of the handle pivots the fork to move the lock pin.

In accordance with even yet another aspect of the present invention, a seat track assembly comprises, in combination, a first track and a second track movable relative to the first track in a longitudinal direction. A lock mechanism carried by the second track includes a lock pin axially movable between a locking position wherein the lock pin is in engagement with the first track so that the second track is secured against movement relative to the first track and an unlocking position wherein the lock pin is out of engagement with the first track so that the second track is movable relative to the first track. A guide forms a cylinder supporting axial movement of the lock pin and a spring member resiliently biases the lock pin toward the locking position. A release assembly is provided for selectively operating between a normal condition wherein the spring member is free to act on the lock pin and a release condition wherein the lock pin is moved to the unlocking position against the bias of the spring member. A second spring member biases the release assembly toward the release condition. A bias force of the second spring member is decreased as the release assembly moves from the normal condition toward the release condition.

From the foregoing disclosure and the following more detailed description of various preferred embodiments it will be apparent to those skilled in the art that the present invention provides a significant advance in the technology and art of seat track assemblies. Particularly significant in this regard is the potential the invention affords for providing a high quality, reliable, low cost universal assembly. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein.

It should be understood that the appended drawings are not necessarily to scale, presenting a somewhat simplified representation of various preferred features illustrative of the basic principles of the invention. The specific design features of a seat track assembly as disclosed herein, including, for example, specific dimensions, orientations, and shapes of the tracks will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the seat track assembly illustrated in the drawings. In general, up or upward refers to an upward direction in the plane of the paper in FIGS. 6, 7 and 9, and down or downward refers to a downward direction in the plane of the paper in FIGS. 6, 7, and 9. Also in general, vertical refers to an upward/downward direction in the plane of the paper in FIGS. 6, 7, and 9 and horizontal refers to a left/right direction in the plane of the paper in FIGS. 6, 7, and 9. Furthermore in general, rearward or rear refers to a direction toward the rear of the seat and forward or front refers to a direction toward the front of the seat.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved seat track assembly disclosed herein. The following detailed discussion of various alternative and preferred embodiments will illustrate the general principles of the invention with reference to a seat track assembly suitable for use in a motor vehicle seat such as an automobile seat. Other embodiments suitable for other applications will be apparent to those skilled in the art given the benefit of this disclosure.

Figure 1:
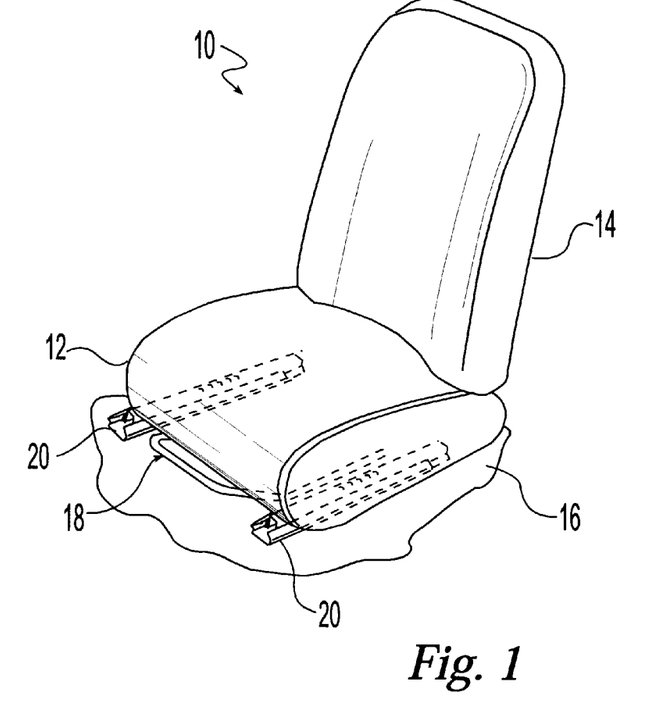
FIG. 1 is a perspective view of a vehicle seat assembly having a seat track assembly according to a preferred embodiment of the present invention.
Figure 2:
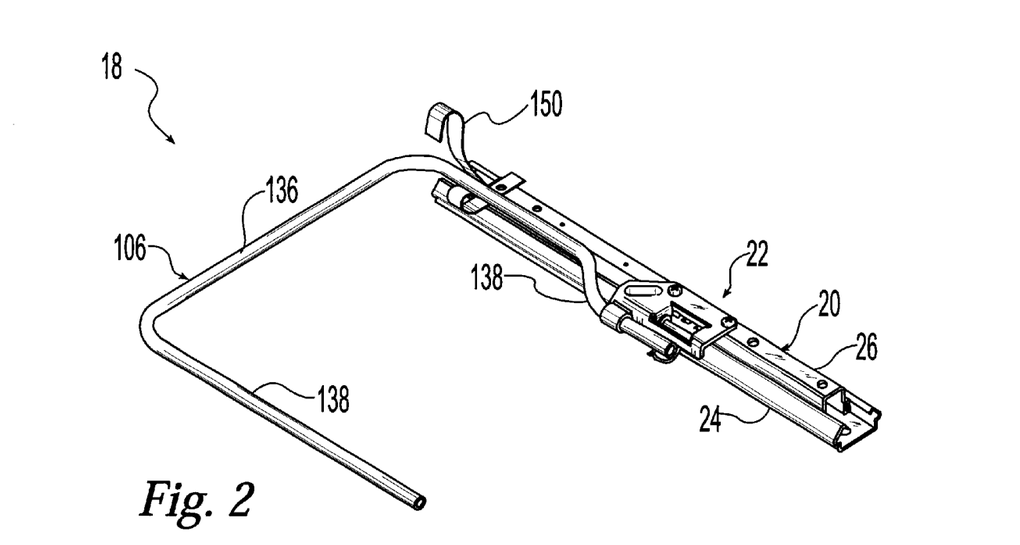
FIG. 2 is a perspective view of a seat track assembly of the vehicle seat assembly of FIG. 1 wherein a set of seat tracks is removed for clarity.

Referring now to the drawings, FIGS. 1 and 2 diagrammatically illustrate a vehicle seat assembly 10 mounted within a motor vehicle. The vehicle seat assembly 10 includes a seat base portion 12 and a seat back portion 14 upwardly extending at a rear edge of the seat base portion 12. The seat base portion 12 is mounted to the vehicle floor or frame 16 with an adjustable mounting assembly 18. The mounting assembly 18 includes a pair of parallel and laterally spaced apart seat track assemblies 20 and a lock mechanism 22. Typically, one of the seat track assemblies 20 is positioned under one lateral side of the seat base portion 12 and the other of the seat track assemblies 20 is positioned under the opposite lateral side of the seat base portion 12.

Each seat track assembly 20 includes first and second seat tracks 24, 26. Load transmission elements 28 (FIGS. 6 and 7) are provided between the first and second seat tracks 24, 26 to transfer load of the first seat track 24 (and everything secured to it, including the seat and any occupant of the seat) to the second seat track 26, to provide as little resistance as possible during position adjustment, and to provide lateral stabilization of the first and second seat tracks 24, 26. The load transmission elements 28 can be, for example, spherical rolling members such as ball bearings, cylindrical rolling members such as rollers, or sliding members such as sliders. One of the first and second seat tracks 24, 26 is fixed to the floor 16 of the motor vehicle and the other of the first and second seat tracks 24, 26 is fixed to the seat base portion 12. In the illustrated embodiment, the first or lower seat track 24 is fixed to the floor 16 of the motor vehicle, either directly or indirectly via risers, and the second or upper seat track 26 is affixed to the seat base portion 12, either directly or indirectly via risers. The forward/rearward position of the vehicle seat assembly 10 is adjusted by moving the first seat tracks 24 longitudinally, with seat base portion 12 attached thereto, over the second seat tracks 26 which are fixed in position relative to the vehicle floor 16. The locking mechanism 22 is used to selectively hold and release the first seat tracks 24 with respect to the second tracks 26 at desired positions.

Figure 6:
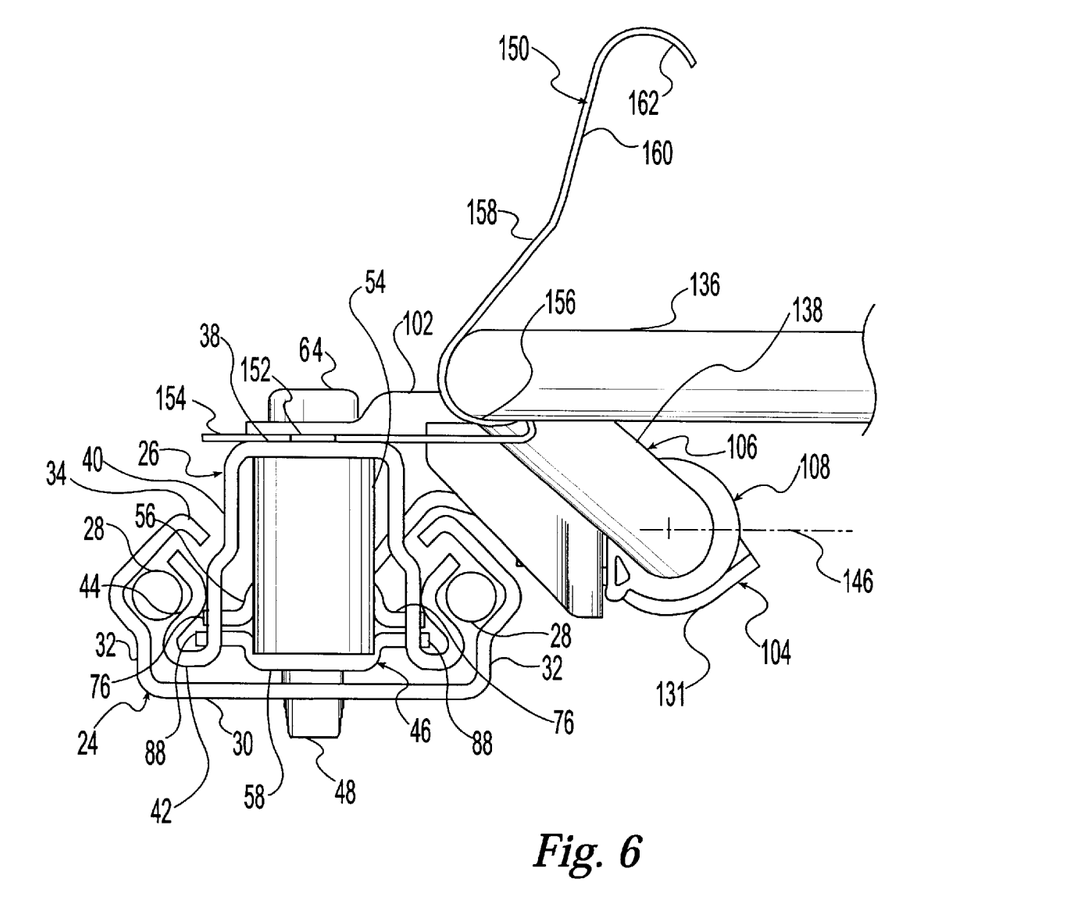
FIG. 6 is an enlarged front end view of the seat track assembly of FIG. 2.
Figure 7:
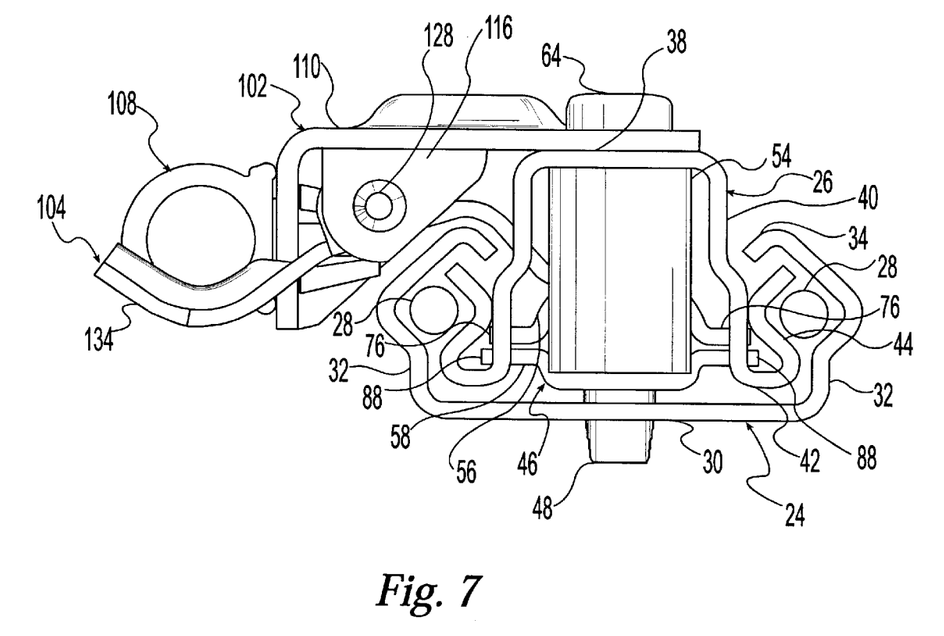
FIG. 7 is an enlarged front rear view of the seat track assembly of FIG. 2.
Figure 8:
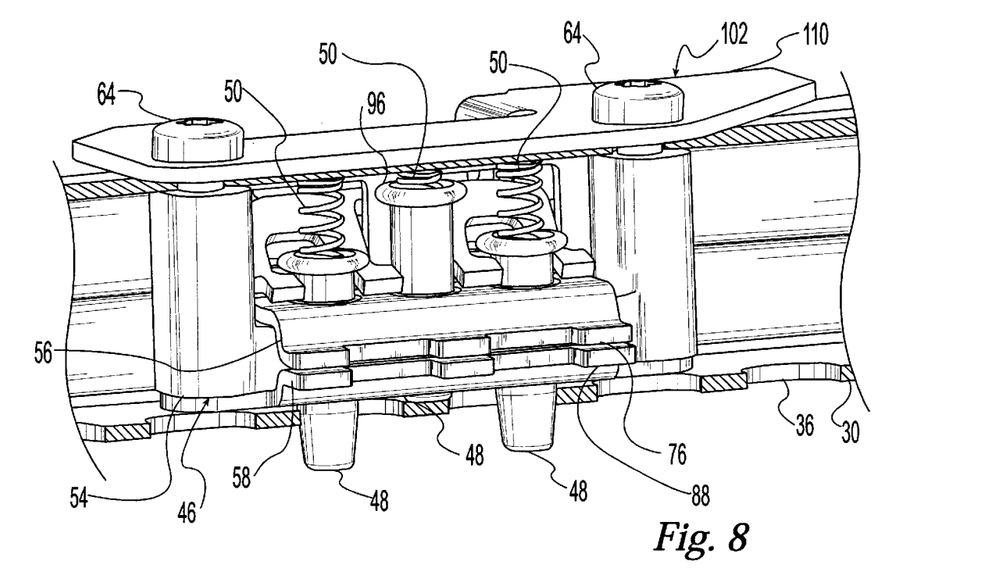
FIG. 8 is perspective view showing the lock mechanism of FIGS. 4 and 5 with a potion of the upper track removed for clarity.

As best shown in FIGS. 6 and 7, each first or lower seat track 24 is generally "U-shaped" and open at the top. Each lower seat track 24 has a generally horizontal bottom wall 30, a pair of side walls 32 upwardly extending form opposed lateral edges of the bottom wall 30, and down-turned flanges 34 extending from the top edges of the side walls 32. The side walls 32 form raceways for the load transmission elements 28. A plurality of longitudinally spaced apart openings 36 (FIGS. 8 and 9) are formed along the bottom wall 30. The openings 36 are sized and shaped to cooperate with the lock mechanism 22 as described in more detail hereinafter. The walls and flanges 30, 32, 34 of the lower seat track 24 are preferably unitary, that is, formed from a single piece of material. The lower track 24 can be formed of any suitable rigid material such as, for example, steel.

Each second or upper seat track 26 is adapted to cooperate with one of the lower seat tracks 24 such that it is movable or slidable thereon. Each illustrated upper seat track 26 is generally "inverted-U-shaped" and open at the bottom. Each upper seat track 26 has a generally horizontal top wall 38, a pair of generally vertical side walls 40 downwardly extending form opposed lateral edges of the top wall 38, a pair of generally horizontal bottom walls 42 outwardly extending from the bottom edges of the side walls 40, and up-turned flanges 44 upwardly extending from the outer edges of the bottom walls 42 and laterally spaced-apart from the side walls 40. The upper seat track 26 is preferably sized and shaped to cooperate with the lower seat track 24 to be slidably received within the lower seat track 24 with the flanges 44 of the upper seat track 26 laterally spaced inside the side walls 32 of the lower seat track 24. The flanges 44 form raceways for the load transmission elements 28 such that the load transmission elements 28 are retained between the flanges 44 of the upper seat track 26 and the side walls 32 of the lower seat track 24 to facilitate relative sliding movement between the upper and lower seat tracks 24, 26. The walls and flanges 38, 40, 42, 44 of the upper seat track 26 are preferably unitary, that is, formed from a single piece of material. The upper seat track 26 can be formed of any suitable rigid material such as, for example, steel. It will be readily apparent to those skilled in the art, given the benefit of this disclosure, that that the lower and upper seat tracks 24, 26 can be modified to have profiles of many different shapes and sizes without falling outside the scope of the present invention.

As best shown in FIGS. 3 to 9, the illustrated lock mechanism 22 includes a lock pin housing 46, a plurality of lock pins 48 independently moveable between locking and unlocking positions, spring members 50 resiliently biasing the lock pins 48 toward the lock position, and a release assembly 52 for selectively moving and/or holding all of the lock pins 48 to the unlocking position.

The illustrated lock pin housing 46 includes a guide or guide block 54 secured between upper and lower shear plates 56, 58 in a clamshell manner. The guide block 54 is sized and shaped to support the lock pins 48 and fit entirely within the interior channel of the upper seat track 26. The illustrated guide block 54 has an elongate main portion 60 and end portions 62 upwardly extending from opposite ends of the main portion 60. The end portions 62 engage the lower side of the top wall 38 of the upper seat track 26. The guide block 54 is preferably secured to the upper seat track 26 in a fixed position so that it is carried with the upper seat track 26. The illustrated guide block 54 is secured to the upper seat track 26 by a pair of mechanical fasteners 64 which extend downwardly through openings 66 in the top wall 38 of the upper seat track 26 to vertical openings 68 in the end portions 62 of the guide block 54. It is noted that the guide block 54 can alternatively be secured to the upper seat track 26 in other suitable manners such as, for example, adhesive or heat staking. The main portion 60 is provided with a plurality of vertically extending, parallel, and spaced apart passages 70 for the lock pins 48 as described in more detail hereinafter. The guide block 54 is preferably formed of plastic but can alternatively be formed of other suitable materials.

The illustrated upper shear plate 56 has a generally horizontal and planar main portion 72, side walls 74 downwardly extending from opposed lateral edges of the main wall 72 and generally horizontal and planar teeth 76 outwardly and horizontally extending from the side walls 74. The illustrated upper shear plate 56 has three longitudinally spaced apart teeth 76 extending from each side wall 74 but a fewer or greater number of teeth 76 could be utilized. The main wall 72 is sized and shaped to overlay the top if the guide block main portion 60 between the guide block end portions 62. The main wall 72 is provided with a plurality of openings 78 for passage of the lock pins 48 therethrough. The illustrated openings 78 are sized for receiving flange portions 80 of the guide block 54 therein to act as integral bushings for the lock pins 48. The side walls 74 are sized and shaped to downwardly extend partially along the sides of the guide block main portion 60. The teeth 76 are sized and shaped to extend into a plurality of longitudinally spaced-apart notches 82 (FIG. 5) formed in the lower end of the side walls 40 of the upper seat track 26. Preferably, the teeth 76 extend entirely through the side walls 40. The upper shear plate 56 is preferably formed of steel but can alternatively be formed of any other suitable material.

The illustrated lower shear plate 58 has a generally horizontal and planar main portion or wall 84, side walls 86 upwardly extending from opposed lateral edges of the main wall 84 and generally horizontal and planar teeth 88 outwardly and horizontally extending from the side walls 86. The illustrated lower shear plate 58 has three longitudinally spaced apart teeth 88 extending from each side wall 86 but a fewer or greater number of teeth 88 could be utilized. Preferably, the number and location of the teeth 88 of the lower shear plate 58 are the same as the teeth 76 of the upper shear plate 56. The main wall 84 is sized and shaped to underlay the bottom of the guide block main portion 60 and preferably extends the length of the guide block 54. The main wall 84 is provided with a plurality of openings 90 for passage of the lock pins 48 therethrough. The illustrated openings 90 are sized for receiving the flange portions 80 of the guide block 54 therein to act as integral bushings for the lock pins 48. The side walls 86 are sized and shaped to upwardly extend partially along the sides of the guide block main portion 60. The teeth 88 are sized and shaped to extend into the- notches 82 (FIG. 5) below the teeth of 76 the upper shear plate 56. The lower shear plate 58 is preferably secured to the guide block 54 by mechanical fasteners 92. The illustrated mechanical fasteners 92 flat head screws which extend upwardly through openings 94 in the main wall 84 of the lower shear plate 58 to the vertical openings 68 in the end portions 62 of the guide block 54. It is noted that the lower sheer plate 58 can alternatively be secured to the guide block 54 in other suitable manners such as, for example, a press fit, adhesive, or heat staking. Preferably, the teeth 88 extend entirely through the side walls 40 of the upper seat track 26. The lower shear plate 58 is preferably formed of steel but can alternatively be formed of any other suitable material.

As is apparent from the above description, the upper and lower shear plates 56, 58 sandwich the guide block 54 in a clamshell manner, that is, they cooperate to encircle the main portion 60 of the guide block 54. The lower shear plate 58 is located near the bottom wall 30 of the lower seat track 24. The lower shear plate 58 is preferably located as close to the lower seat track 24 as possible without engaging the lower seat track 24 during movement of the upper set track 26 relative to the lower seat track 24, taking into manufacturing tolerances of the components. The lower shear plate main wall 84 is preferably positioned slightly above the lower seat track bottom wall 30 a distance in the range of about 0.0 mm to about 3.0 mm and more preferably a distance of about 1.5 mm. Constructed in this manner, the guide block 54 guides and positions the lock pins 48 while the shear plates 56, 58 transmit loads between the lower and upper seat tracks 24, 26 under crash conditions. It is noted that, the guide block 54 is essentially removed from the load path when constricted in this manner.

Each lock pin 48 is generally cylindrically shaped having an angled or tapered lower end, that is, a lower end of gradually decreasing diameter to a frustum of a cone. The upper end of each lock pin 48 is provided with a head or flange 96 of increased diameter to form a downward facing abutment encircling the lock pin 48. The upper end of each lock pin is also provided with an upward opening cavity or pocket 98 which is closed at its lower end. The illustrated embodiment includes three of the lock pins 48 vertically extending through the passages 70 of the guide block. The lock pins 48 are independently movable in the vertical direction between a locking position wherein the lower end of the lock pin 48 at least partially engages the openings 36 in the lower seat track 24 and an unlocking position wherein the lock pin 48 is out of engagement with the openings 36 in the lower seat track 24. It is noted that a greater or lesser number of the lock pins 48 can be utilized within the scope of the present invention.

Figure 9:
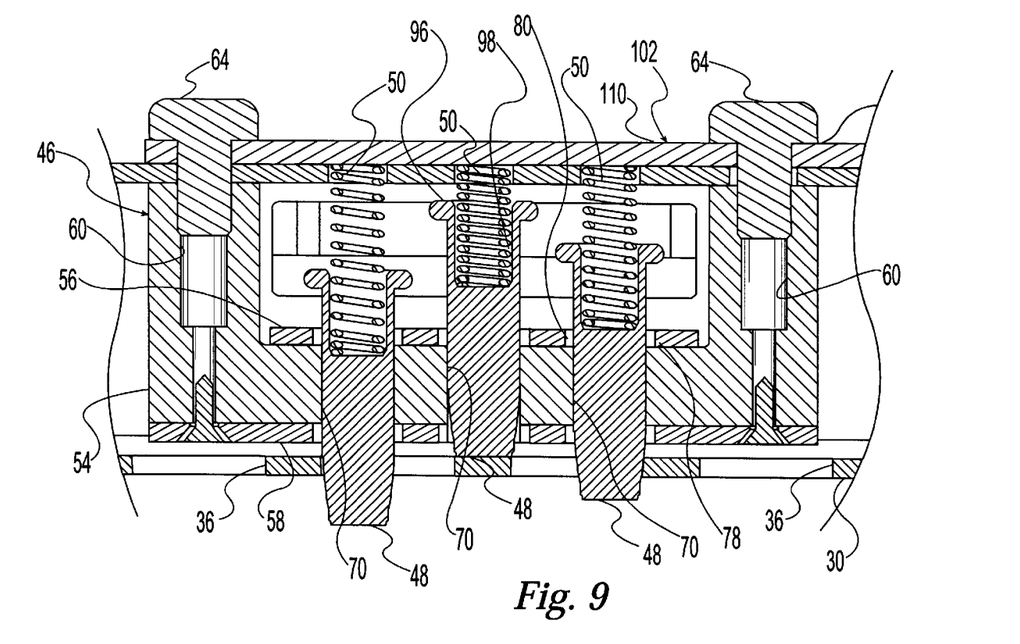
FIG. 9 is cross-sectional view of the lock mechanism of FIG. 8 taken along a vertical plane at the central longitudinal axis of the upper seat track.

The illustrated spring members 50 are vertically extending helical-coil compression springs biasing the lock pins 48 toward the lock position. Each lock pin 48 has a separate spring member 50 acting directly thereon. The lower end of each spring member 50 extends into the pocket 98 of the lock pin 48. The upper end of each spring member 50 extends into an opening 100 in the top wall 38 of the upper seat track 26 and engages a lock bracket 102 rigidly secured to the upper seat track 26. The openings 100 in the upper seat track 26 form seats which position and hold the upper ends of the spring members 50. It is noted that, alternatively, seats for the spring members 50 could be formed or attached to the lower surface of the top wall 38 of upper seat track 26. Mounted in this manner, the spring members 50 act directly between the lock bracket 102 and the upper end of the lock pins 48 to resiliently bias the lock pins 48 in a downward direction toward the locking position. The spring members 50 are located entirely within the interior channel of the upper seat track 26. As best shown in FIG. 9, when the lock pins 48 are in the unlocking position, the compressed spring members 50 are almost entirely (at least ⅔ the compressed length) within the lock pin pockets 98.

The illustrated lock mechanism 22 includes three of the lock pins 48 which are parallel and equally spaced. It is noted that a number of lock pins 48 lesser or greater than three can be utilized within the scope of the present invention but at least one lock pin is preferred. As best shown in FIG. 9, the lock pins 48 and the openings 36 are preferably sized and spaced so that at each position of the second seat track 26 relative to the first seat track 24, a first one of the three lock pins 48 fully engages one of the openings 36, a second one of the three lock pins 48 is blocked by the bottom wall 30 and does not engage one of the openings 36, and a third one of the three lock pins 48 partially engages one of the openings, that is, the tapered end of the lock pin 48 contacts the edge of one of the openings 36. It should also be noted that the illustrated lock mechanism 22 is located entirely within the interior space formed by the second seat track 26 when the lock pins are in their unlocked position.

Figure 3:
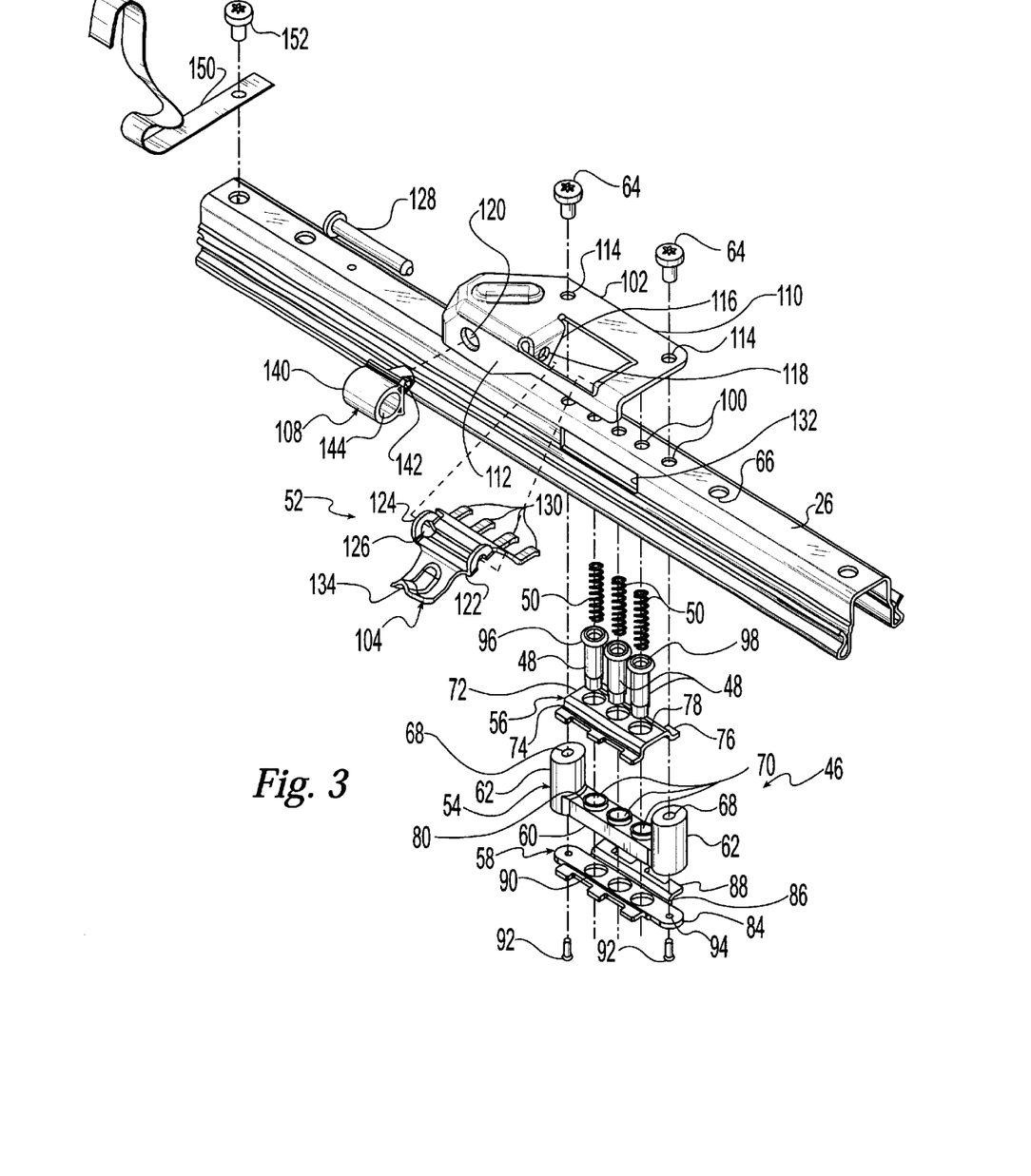
FIG. 3 is an exploded view of the seat track assembly of FIG. 2 wherein a lower track and a towel bar are removed for clarity.

The illustrated release assembly 52 includes the lock bracket 102, a release fork 104, a release member or handle 106, and a handle clip 108. As best shown in FIG. 3, the lock bracket 102 has a horizontally extending generally planar main wall 110 and vertically extending generally planar side wall 112 downwardly extending from a lateral edge of the main wall 110. The main wall 110 is sized and shaped to overlay the top wall 38 of the upper seat track 26 and laterally extend therefrom in a cantilevered manner. The main wall 110 is provided with openings 114 for receiving the mechanical fasteners 64 therethrough to rigidly secure the lock bracket 102 to the upper seat track 26. The main wall 110 is sized and shaped to overlay the spring member openings 100 in the upper seat track 26 to form the seats for the spring members 50. The main wall 110 also has a pair of downwardly extending and spaced-apart tabs or flanges 116 with openings 118 therein for securing and supporting the release fork 104 as described in more detail hereinafter. The side wall 112 is provided with an opening 120 for securing the handle clip 108 as described in more detail hereinafter.

The illustrated release fork 104 includes a main body 122 and a pair of upwardly extending and spaced-apart tabs or flanges 124 extending from the main body 122. The tabs 124 have openings 126 formed therein which are sized and shaped to cooperate with the flanges 116 of the lock bracket 102 to receive a pivot pin 128 to pivotably attach the release fork 104 to the lock bracket 102. Attached in this manner, the pivot pin 128 forms a pivot axis for the release fork 104 which is substantially parallel to the longitudinal axis of the lower and upper seat tracks 24, 26. The release fork 104 also includes a plurality of spaced apart prongs or fingers 130 which laterally extend from the main body 122. The illustrated release fork 104 has four fingers 130 for forming three openings or spaces therebetween to receive the three lock pins 48 between the fingers 130. It is noted that a lesser or greater number of fingers 130 can be utilized within the scope of the present invention. The fingers 130 are sized and shaped to extend through a window or opening 132 formed in the side wall 40 of the upper seat track 26 and below the heads 96 of the lock pins 48 to engage the downward facing engagement surfaces formed by the lock pin heads 96. When the release fork 104 is pivoted about the pivot pin 128 in a direction which raises the fingers 130, the fingers 130 engage the lock pin heads 96 and raise the lock pins 48 toward the unlocking position against the bias of the spring members 50. The release fork 104 also includes a fork arm 134 laterally extending from the main body 122 in an opposite direction from the fingers 130. The fork arm 134 is sized and shaped to cooperate with the handle 106 as described in more detail hereinafter.

The illustrated release member or handle 106 is generally "U-shaped" having a generally straight front or main portion 136 and a pair of generally strait side portions 138 perpendicularly extending from the opposed ends of the main portion 1366. The illustrated handle 106 is formed by a bent hollow tube having a circular cross-section but other forms of handles can be utilized within the scope of the present invention. As best shown in FIGS. 1 and 2, the side portions 138 of the handle 106 are attached to the upper seat tracks 26 such that the front or main portion 136 of the handle 106 extends laterally in front of the seat base portion 12 just below the front edge of the seat base portion 12. One side portion 138 is pivotally attached directly to the lock bracket 102 by the handle clip 108 as described in more detail herein below while the other side portion 138 is pivotally attached to the other upper seat track 26 in any suitable manner. It is noted that alternatively both track assemblies 20 can be provided with lock mechanisms.

Figure 4:
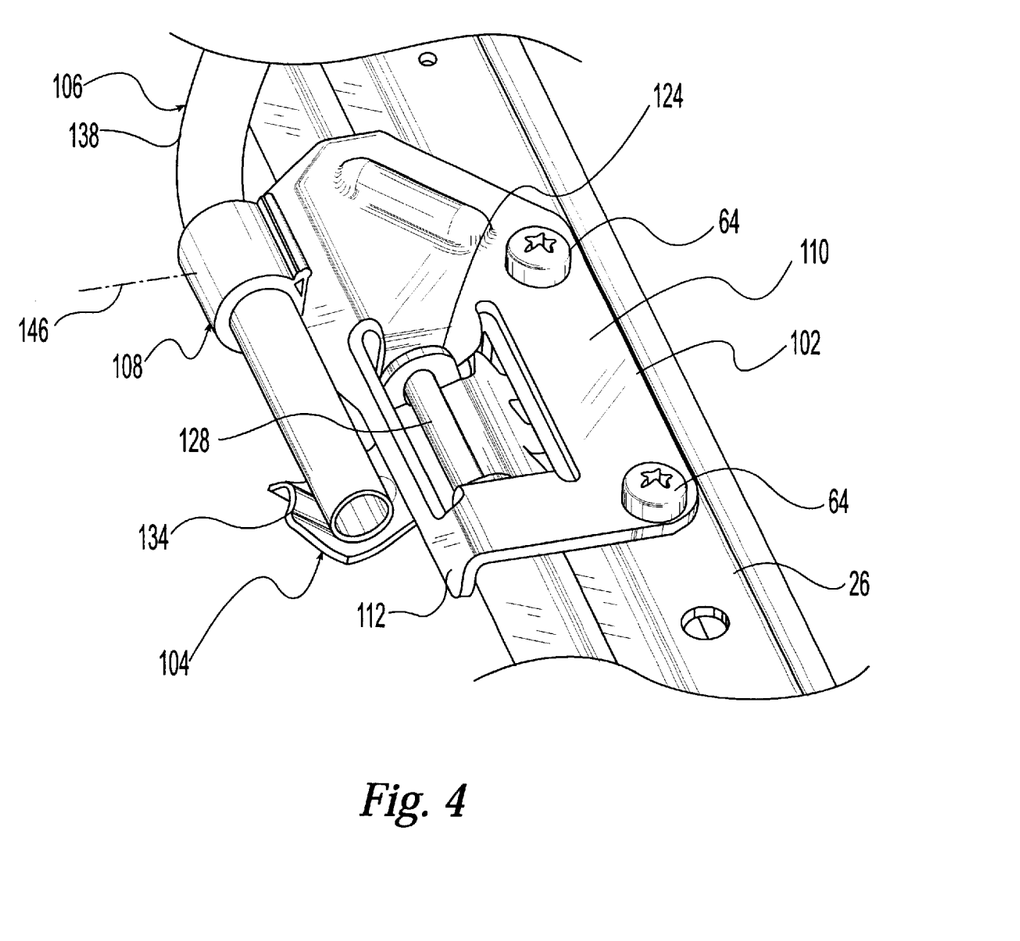
FIG. 4 is an enlarged fragmented view of a portion the seat track assembly of FIG. 2 in the area of a lock mechanism.
Figure 5:
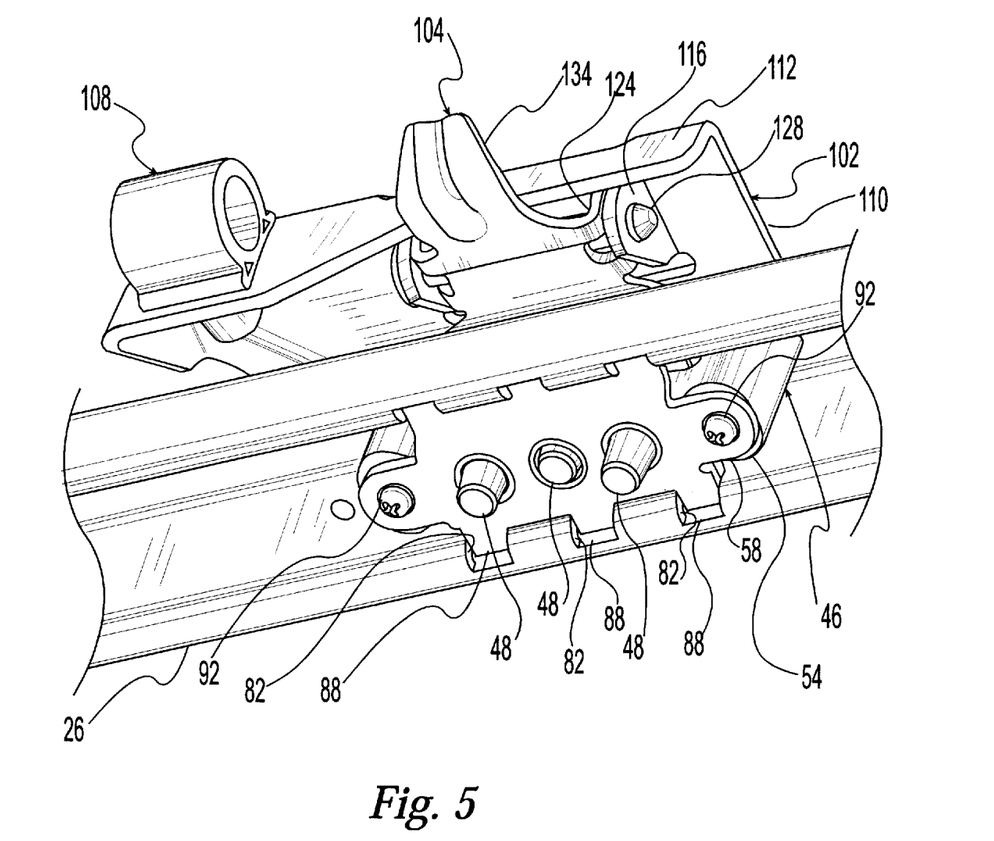
FIG. 5 is an enlarged fragmented view similar to FIG. 4 but showing the opposite side of the lock mechanism and wherein the towel bar is removed for clarity.
Figure 10:
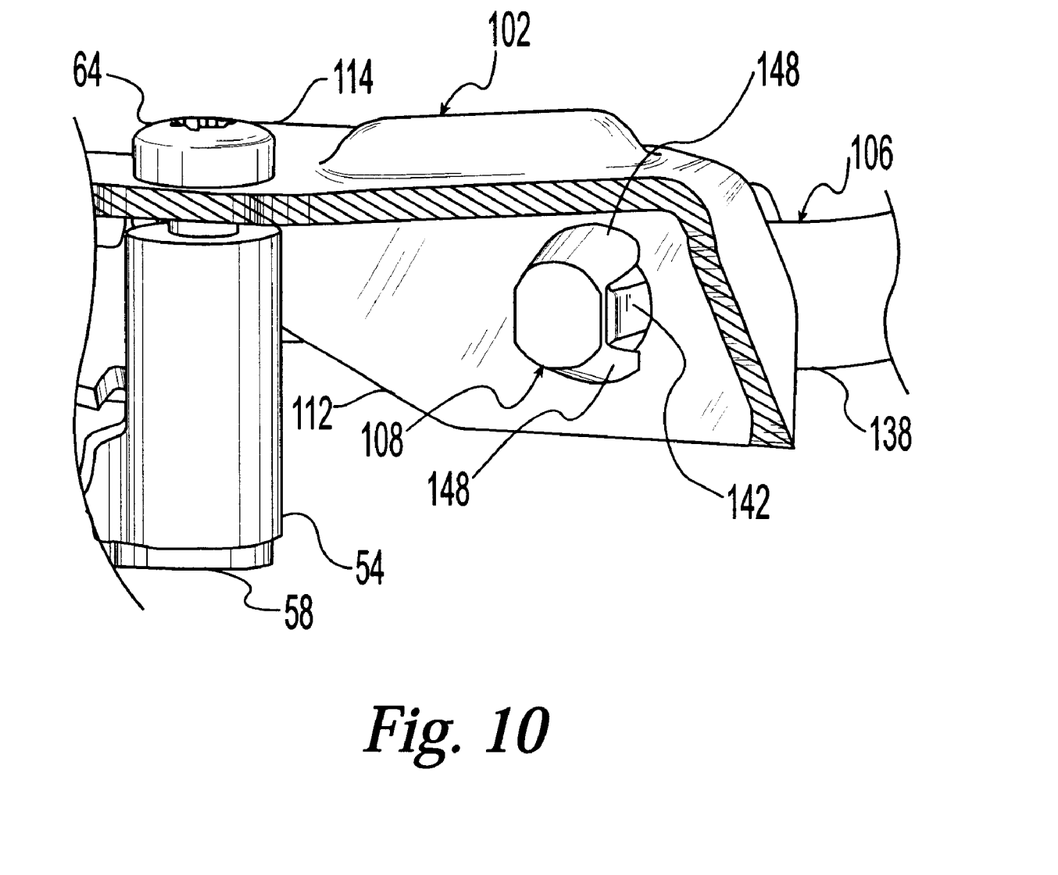
FIG. 10 is a perspective view of a handle clip of the lock mechanism of FIGS. 4 and 5.

As best shown in FIGS. 3, 4, and 10, the illustrated handle clip 108 has a main portion 140 and a connection portion 142. The main portion 140 has a passage 144 extending therethrough for closely receiving the side portion 138 of the handle 106 so that the side portion 138 extends through the main portion 140 of the handle clip 108. The connection portion 142 is sized and shaped to pivotably secure the main portion 140 to the lock bracket 102 such that the main portion 140 is pivotable about a horizontally extending pivot axis 146 substantially perpendicular to the longitudinal axis of the upper sear track 26 and substantially perpendicular the handle passage 144 in the main portion 140. The illustrated connection portion 142 is formed as a spring clip which removably secures the handle clip 108 to the lock bracket 102. The illustrated connection portion 142 is generally cylindrical-shaped and has a plurality of resiliently deflectable protrusions or fingers 148 extending therefrom which are sized and shaped to be radially inwardly deflected by the lock bracket 102 when inserted into the opening 120 in the lock bracket side wall 112 and resiliently snap-back radially outwardly when beyond the side wall 112 of the lock bracket 102. Once the fingers 148 resiliently snap back beyond the side wall 112 of the lock bracket 102, they substantially limit axial movement of the handle clip 108. Secured in this manner, the handle clip 108 is freely pivotable about its pivot axis 146.

The handle 106 is mounted by extending the side portion 138 through the passage of the handle clip and above the arm of the release fork 104. Mounted in this manner, an upward force on the main portion 136 of the handle 106 pivots the handle 106 about the handle clip pivot axis 146 and downwardly moves the end of the handle side portion 138 which is in sliding engagement with the release fork arm 134. This downward movement pivots the release fork 104 about the pivot pin 128 which raises the fingers 130 of the release fork 104. The fingers 130, which engage the lock pins heads 96, upwardly carry the lock pins 48 against the bias of the spring members 50. Upon suitable upward movement of the handle 106, all of the lock pins 48 are moved to the unlocking position. Upon release of the handle 106, the spring members 50 downwardly move the lock pins 48. The downward movement of the lock pins 48 moves the fingers 130 in a downward direction to pivot the release fork 104 about the pivot pin 128 and raise the release fork arm 134. The rising release fork arm 134 upwardly moves the end of the handle side portion 138 to pivot the handle 106 about the handle clip pivot axis 146 and downwardly move the main portion of the handle 136 to an at rest position.

The illustrated lock mechanism 22 also includes a secondary spring member 150 which applies a downward force directly on the handle 106 to assist the lock pins 48 in moving toward the locking positions. The secondary spring member 150 enables to the spring members 50 to be sized much smaller because the spring members 50 do not need to provide all of the force to return the handle 106 when released. The secondary spring member 150 preferably applies a decreasing force as the main portion 136 is raised, that is, the higher the handle main portion 136 travels, the lower the force applied by the secondary spring member 150, so that there is less likely hood that the lock pins 48 will ratchet over the openings 36 in the lower seat track 24 as the seat is adjusted and thus provide quiet operation as the seat is adjusted. The illustrated secondary spring member 150 is a leaf spring secured to the upper track assembly by a mechanical fastener 152 near a forward end of the second seat track 26. The illustrated secondary spring member 150 has a first portion 154 shaped for direct attachment to the seat track 26, a second portion 156 extending from the first portion 154 and shaped for receiving the handle 106 to act as a downward travel stop for the handle 106 when engaged by the handle 106, a third portion 158 extending from the second portion 156 and shaped to provide a first or high level downward force directly on the handle 106, a fourth portion 160 extending from the third portion 158 and shaped to provide a second or low level downward force, less than the force provided by the third portion 158, on the handle 106, and a fifth portion 162 extending from the fourth portion 160 and shaped for receiving the handle 106 to act as an upward travel stop for the handle 106 when engaged by the handle. The illustrated secondary spring member 150 has a fourth portion 160 which engages the handle 106 at a steeper angle than the third portion 158 so that the force on the handle is less when it engages the fourth portion 160 than when it engages the third portion 158 of the secondary spring member 150. Formed in this manner, the secondary spring member 150 provides full up and down travel stops, reduces/ eliminates rattle and free-play in the handle 106 and reduces ratcheting related noise during adjustment.

Figure 11:
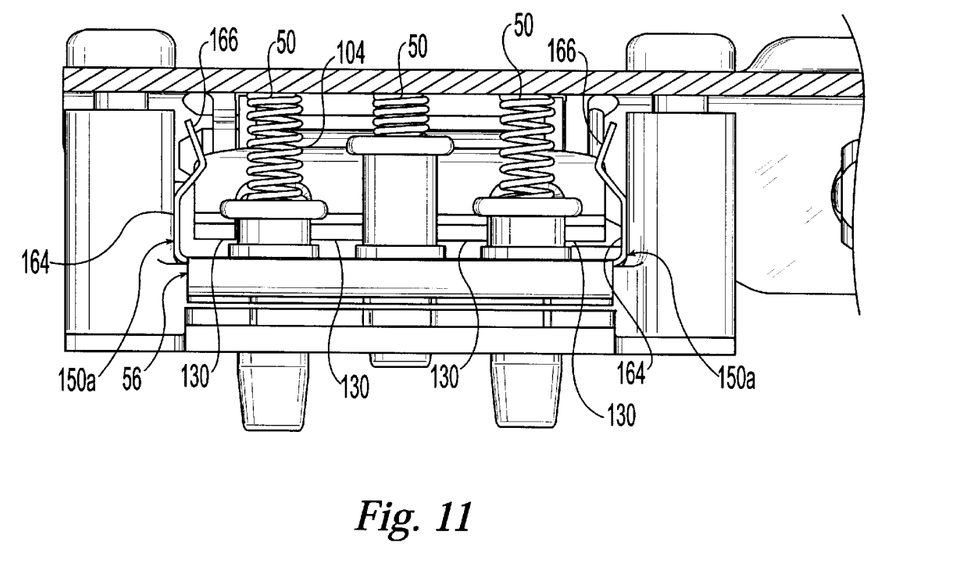
FIG. 11 is an enlarged elevational view of a lock mechanism according to an alternative preferred embodiment of the present invention with a portion of the upper track removed for clarity.
Figure 12:
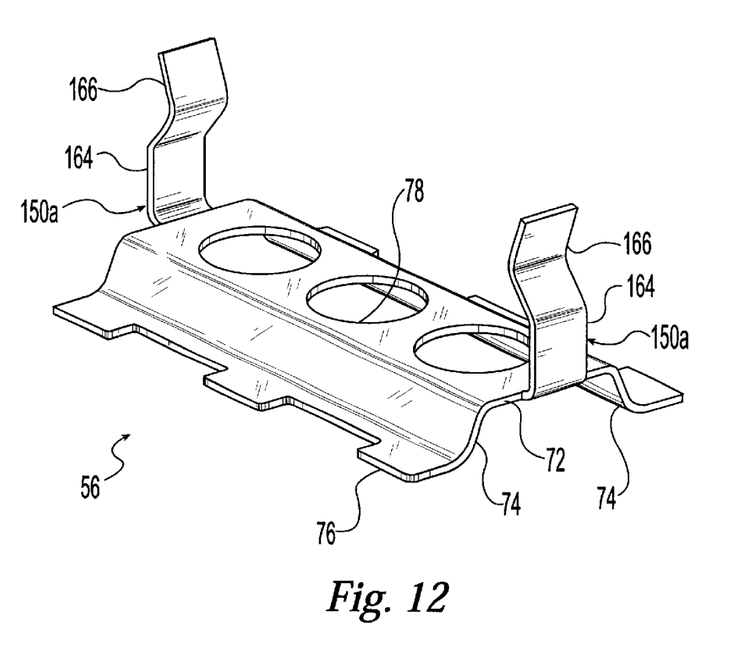
FIG. 12 is a perspective view of an upper shear plate of the lock mechanism of FIG. 11 with secondary spring members unitary with a shear plate.

FIGS. 11 and 12 illustrate an alternative preferred embodiment of the lock mechanism wherein like reference numbers are utilized for like structure. The alternative preferred embodiment is substantially the same as the embodiment disclosed in detail hereinabove except that the secondary spring member 150 is replaced with secondary spring members 150*a* that are unitary with the upper shear plate 56. The secondary spring members 150*a* also assist the lock pins 48 in moving toward the locking positions but the secondary spring members 150*a* act directly on the release fork 104 rather than the handle 106. The secondary spring members 150*a* also enable the spring members 50 to be sized much smaller because the spring members 50 do not need to provide all of the force to return the handle 106 when released. The illustrated secondary spring members 150*a* are leafs springs located at opposed longitudinal ends of the upper shear plate 56. The secondary spring members 150a are preferably unitary with the upper shear plate 56, that is, formed as a single piece of material with the upper shear plate 56. It is noted that the secondary spring members 150a can alternatively be attached to the upper shear plate 56 or other suitable component in any suitable manner. The illustrated secondary spring members 150a each have a first portion 164 upwardly extending from the longitudinal end of the upper shear plate 56 and a second portion 166 extending from the first portion 164 and shaped for downwardly biasing the release fork 104 toward the locking position when engaged by the release fork 104. The illustrated second portion 166 is inwardly curved or convex in a direction toward the openings 78. Formed in this manner, the secondary spring members 150a are located at opposite ends of the upper shear plate 56 and face toward each other so that the release fork vertically moves between the secondary spring members 150a such that the outer fingers 130 directly engage the second portions 166 when moved toward the unlocking position to bias the release fork 104 toward the locking position. It is noted that the illustrated secondary spring members 150a engage the release fork 104 only when the release fork 104 is at and/or near the unlocking position. It is noted that the secondary spring members 150, 150a, can take many different forms to act directly on the release assembly 52 within the scope of the present invention.

From the foregoing disclosure and detailed description of certain preferred embodiments, it is apparent that the present invention improved seat track assembly having a latch mechanism which further reduces the height, reduces the number of parts required, has a relatively low cost to produce, and/or can be rapidly assembled.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A seat track assembly comprising, in combination:
    a first track;
    a second track movable relative to the first track in a longitudinal direction;
    a lock mechanism carried by the second track and including:
        a lock pin axially movable between a locking position wherein the lock pin is in engagement with the first track so that the second track is secured against movement relative to the first track and an unlocking position wherein the lock pin is out of engagement with the first track so that the second track is movable relative to the first track;
        a guide forming a cylinder supporting axial movement of the lock pin;
        first and second shear plates on opposite sides of the guide; and
        a spring member resiliently biasing the lock pin toward the locking position; and
    wherein the lock pin extends through openings in the first and second shear plates and the first and second shear plates are secured to the second track.

2. The seat track assembly of claim 1, wherein the first and second shear plates are formed of metal and the guide is formed of plastic.

3. The seat track assembly of claim 1, wherein the first and second shear plates form a clamshell encircling the guide.

4. The seat track assembly of claim 1, wherein the first and second shear plates are interlocked with the second track.

5. The seat track assembly of claim 4, wherein the first and second shear plates each have a plurality of spaced-apart teeth and the second track has a plurality of spaced apart notches receiving the teeth.

6. The seat track assembly of claim 1, wherein one of the first and second shear plates is directly attached to the guide.

7. The seat track assembly of claim 1, wherein the guide is directly attached to the second track.

8. The seat track assembly of claim 1, wherein the guide has flanges extending through the openings of the first and second shear plates.

9. The seat track assembly of claim 1, wherein the first track has a main wall and the first and second shear plates extend generally perpendicular to the main wall and one of the first and second shear plates is spaced apart from the main wall a distance in the range of about 1.0 mm to about 2.5 mm.

10. The seat track assembly of claim 9, wherein the distance is about 1.5 mm.

11. A seat track assembly comprising, in combination:
    a first track;
    wherein the first track has a main wall, spaced apart side walls extending from opposed edges of the main wall, and a plurality of openings formed in the main wall;
    a second track having an interior space and movable relative to the first track in a longitudinal direction;
    wherein the second track has a main wall and spaced apart side walls extending from opposed edges of the main wall to form the interior space;
    a lock mechanism carried by the second track and including:
        a lock pin axially movable between a locking position wherein the lock pin is in engagement with the first track so that the second track is secured against movement relative to the first track and an unlocking position wherein the lock pin is out of engagement with the first track so that the second track is movable relative to the first track;
        wherein the lock pin extends into one of the openings in the main wall of the first track when the lock pin is in the locking position:
        a guide forming a cylinder supporting axial movement of the lock pin; and
        a spring member resiliently biasing the lock pin toward the locking position; and
    wherein the lock pin, the guide and the spring member are each located entirely within the interior space of the second track when the lock pin is in the unlocking position.

12. The seat track assembly of claim 11, wherein the interior space is channel-shaped.

13. The seat track assembly of claim 11, wherein the spring member is a coiled compression spring.

14. The seat track assembly of claim 11, wherein the spring member engages an end of the lock pin.

15. A seat track assembly comprising, in combination:

a first track;

a second track having an interior space and movable relative to the first track in a longitudinal direction;

wherein the second track has a main wall and spaced apart side walls extending from opposed edges of the main wall to form the interior space;

a lock mechanism carried by the second track and including:
  a lock pin axially movable between a locking position wherein the lock pin is in engagement with the first track so that the second track is secured against movement relative to the first track and an unlocking position wherein the lock pin is out of engagement with the first track so that the second track is movable relative to the first track;
  a guide forming a cylinder supporting axial movement of the lock pin; and
  a spring member resiliently biasing the lock pin toward the locking position;

wherein the lock pin, the guide and the spring member are each located entirely within the interior space of the second track when the lock pin is in the unlocking position; and wherein the end of the lock pin is provided with a pocket and the spring extends into the pocket.

16. A seat track assembly comprising, in combination:

a first track;

a second track movable relative to the first track in a longitudinal direction;

a lock mechanism carried by the second track and including:
  a lock pin axially movable between a locking position wherein the lock pin is in engagement with the first track so that the second track is secured against movement relative to the first track and an unlocking position wherein the lock pin is out of engagement with the first track so that the second track is movable relative to the first track;
  a guide forming a cylinder supporting axial movement of the lock pin;
  a spring member resiliently biasing the lock pin toward the locking position; and
  a release assembly for selectively moving the lock pin to the unlocking position; and wherein the release assembly includes:
  a bracket secured to the second track;
  a fork pivotably attached to the bracket and operably engaging the lock pin so that pivotable movement of the fork moves the lock pin against the bias of the spring member;
  wherein the fork has a plurality of spaced apart fingers extending on opposite sides of the lock pin; and
  a handle pivotally attached to the bracket and operably engaging the release fork so that pivotable movement of the handle pivots the fork to move the lock pin.

17. The seat track assembly of claim 16, wherein the handle is in sliding engagement with the fork.

18. The seat track assembly of claim 16, wherein the handle has a main portion and integral side portions extending from opposed ends of the main portion and the side portion is pivotably secured to the bracket.

19. A seat track assembly comprising, in combination:

a first track;

a second track movable relative to the first track in a longitudinal direction;

a lock mechanism carried by the second track and including:
  a lock pin axially movable between a locking position wherein the lock pin is in engagement with the first track so that the second track is secured against movement relative to the first track and an unlocking position wherein the lock pin is out of engagement with the first track so that the second track is movable relative to the first track;
  a guide forming a cylinder supporting axial movement of the lock pin;
  a spring member resiliently biasing the lock pin toward the locking position; and
  a release assembly for selectively moving the lock pin to the unlocking position; and wherein the release assembly includes:
  a bracket secured to the second track;
  a fork pivotably attached to the bracket and operably engaging the lock pin so that pivotable movement of the fork moves the lock pin against the bias of the spring member;
  a handle pivotally attached to the bracket and operably engaging the release fork so that pivotable movement of the handle pivots the fork to move the lock pin; and
  wherein the handle is pivotably secured to the bracket by a spring clip.

20. A seat track assembly comprising, in combination:

a first track;

a second track movable relative to the first track in a longitudinal direction;

a lock mechanism carried by the second track and including;
  a lock pin axially movable between a locking position wherein the lock pin is in engagement with the first track so that the second track is secured against movement relative to the first track and an unlocking position wherein the lock pin is out of engagement with the first track so that the second track is movable relative to the first track;
  a guide forming a cylinder supporting axial movement of the lock pin;
  a spring member directly biasing the lock pin toward the locking position; and
  a release assembly selectively operable between a normal condition wherein the spring member is free to act on the lock pin and a release condition wherein the lock pin is moved to the unlocking position against the bias of the spring member; and a second spring member directly biasing the release assembly toward the normal condition.

21. The seat track assembly of claim 20, wherein the release assembly includes: a pivotable fork operably engaging the lock pin so that pivotable movement of the fork moves the lock pin against the bias of the spring member and a pivotable handle pivotally operably engaging the release fork so that pivotable movement of the handle pivots the fork to move the lock pin and wherein the second spring member directly engages the handle.

22. The seat track assembly of claim 21, wherein the second spring member is a leaf spring engaging the handle.

23. The seat track assembly of claim 21, wherein the second spring member is a leaf spring engaging the fork.

24. The seat track assembly of claim 20, wherein the second spring member is a leaf spring.

25. The seat track assembly of claim 24, wherein the second spring member forms travel stops for the release assembly.

26. The seat track assembly of claim 24, wherein the second spring member is secured to the second track and spaced from the lock pin in the longitudinal direction.

27. The seat track assembly of claim 24, wherein the second spring member has a first and second portions which engage the release assembly at different angles to provide first and second forces of different magnitude.

28. The seat track assembly of claim 20, wherein a bias force of the second spring member is decreased as the release assembly moves from the normal condition to the release condition.

\* \* \* \* \*